United States Patent
Revashetti et al.

(10) Patent No.: US 11,368,435 B2
(45) Date of Patent: Jun. 21, 2022

(54) BEACON CLOUD REPUTATION SERVICE

(71) Applicant: McAfee, Inc., Santa Clara, CA (US)

(72) Inventors: Siddaraya Revashetti, Cupertino, CA (US); Priyadarshini Rao Rajan, Palo Alto, CA (US); Sulakshana Zambre, Santa Clara, CA (US); Saira Sunil, Fremont, CA (US); Susmita Nayak, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 373 days.

(21) Appl. No.: 15/011,231

(22) Filed: Jan. 29, 2016

(65) Prior Publication Data
US 2017/0222980 A1 Aug. 3, 2017

(51) Int. Cl.
| | | |
|---|---|---|
| *H04W 4/029* | (2018.01) | |
| *H04W 4/80* | (2018.01) | |
| *H04W 12/128* | (2021.01) | |
| *H04W 48/10* | (2009.01) | |
| *H04W 48/12* | (2009.01) | |
| *H04L 9/40* | (2022.01) | |

(52) U.S. Cl.
CPC .......... *H04L 63/04* (2013.01); *H04L 63/1408* (2013.01); *H04W 4/029* (2018.02); *H04W 4/80* (2018.02); *H04W 12/128* (2021.01); *H04W 48/10* (2013.01); *H04W 48/12* (2013.01)

(58) Field of Classification Search
CPC . H04L 63/04; H04L 63/1408; H04L 63/0876; H04W 4/02; H04W 48/10; H04W 48/08; H04W 4/80; H04W 12/12; H04W 48/12; H04W 4/029; H04W 12/128
See application file for complete search history.

(56) References Cited

U.S. PATENT DOCUMENTS

| 8,108,536 B1 | 1/2012 | Hernacki et al. |
| 9,622,024 B1* | 4/2017 | Shanmugam ........... H04W 4/80 |
| 10,068,089 B1* | 9/2018 | Shavell ............... H04L 63/1433 |
| 2009/0235354 A1* | 9/2009 | Gray ................... H04L 63/1416 |
| | | 726/22 |

(Continued)

OTHER PUBLICATIONS

Estimote, Inc., "Beacon Tech Overview—Estimote Developer", http://developer.estimote.com, dated Apr. 29, 2016, pp. 1-5, copyright 2012-2014 by Estimote, Inc., New York, New York.

(Continued)

*Primary Examiner* — Alexander Lagor
*Assistant Examiner* — Forrest L Carey
(74) *Attorney, Agent, or Firm* — Hanley, Flight & Zimmerman, LLC

(57) ABSTRACT

A technique for determining the safety of the content of beacon transmissions. A user device extracts beacon identification information from a beacon transmission. The user device queries the beacon registry to obtain the targeted content. The user device provides the targeted content and beacon identification information to a validation service. The validation service evaluates the targeted content and the beacon identification information for safety. The validation service determines a score based on that evaluation and sends the score to the user device. The user device alerts the user or performs background actions such as suppression of transmission of beacon contextual data to other apps on user device based on the score.

20 Claims, 6 Drawing Sheets

(56) References Cited

U.S. PATENT DOCUMENTS

| | | | |
|---|---|---|---|
| 2010/0266125 A1* | 10/2010 | Tanaka | H04W 8/205 |
| | | | 380/270 |
| 2011/0145920 A1* | 6/2011 | Mahaffey | G06F 21/564 |
| | | | 726/22 |
| 2013/0227700 A1 | 8/2013 | Dhillon et al. | |
| 2015/0072618 A1 | 3/2015 | Granbery | |
| 2015/0126119 A1 | 5/2015 | Schulz et al. | |
| 2015/0172314 A1* | 6/2015 | Mononen | H04L 63/1416 |
| | | | 726/8 |
| 2015/0334569 A1 | 11/2015 | Rangarajan et al. | |
| 2016/0080486 A1* | 3/2016 | Ram | H04L 12/1822 |
| | | | 709/205 |
| 2016/0227471 A1* | 8/2016 | De Foy | H04W 4/001 |
| 2016/0277424 A1* | 9/2016 | Mawji | G06Q 20/4016 |
| 2016/0285979 A1* | 9/2016 | Wang | H04L 67/16 |
| 2016/0309015 A1* | 10/2016 | Lee | G06F 17/30 |
| 2017/0006417 A1* | 1/2017 | Canoy | H04L 63/126 |
| 2017/0041325 A1* | 2/2017 | Yang | H04W 12/08 |
| 2017/0126705 A1* | 5/2017 | Mirashrafi | H04L 63/145 |

OTHER PUBLICATIONS

Developers—Google, "Mark up the world using beacons" http://developers.google.com/beacons/, dated Apr. 29, 2016, pp. 1-5.

Github—Google/Eddystone, "Specification for Eddystone, an open beacon format from Google", https://github.com/google/eddystone, dated Apr. 29, 2016, Copyright 2016 GitHub, Inc., pp. 1-2.

International Searching Authority, "International Search Report and Written Opinion," issued in connection with application No. PCT/US2016/060265 dated Feb. 22, 2017, 10 pages.

International Searching Authority, "International Report on Patentability," issued in connection with application No. PCT/US2016/060265, dated Aug. 9, 2018, 10 pages.

\* cited by examiner

BEACON CLOUD REPUTATION SERVICE

TECHNICAL FIELD

Embodiments described herein generally relate to the identification of beacons and more specifically to the verification of the safety of the content transmitted by such beacons.

BACKGROUND ART

Bluetooth® low energy (BLE) was introduced as part of the Bluetooth® Core Specification version 4.0 adopted in June 2010. ("BLUETOOTH" is a registered trademark of Bluetooth SIG, Inc.) BLE was designed to support multiple profiles for wireless device communication. BLE was designed with the low power requirements, small size, low cost, and compatibility in mind.

One implementation of a BLE enabled device is a BLE beacon (beacon). Beacons are small devices that transmit via limited data payloads, serving various purposes. They are typically low-powered devices using BLE protocols, but as used herein, the term "beacon" can include other types of devices, including Near Field Communication (NFC) tags. Targeted applications include health and fitness, information presentation, and advertising. The devices present content in a payload to a client device, and the client device may act on that content.

Beacons interface with client devices by a well-defined protocol. The Eddystone™ protocol developed by Google Inc. is an example, as well as the iBeacon™ protocol developed by Apple Inc. These protocols define how to encode, decode, and transmit data from the beacon to the client device. Specific networking frames defined by the protocol specification contain different data. For example, the Eddystone protocol defines frames that contain Universal Identification (UID) information, which identifies the beacon. Eddystone also defines a frame type for Universal Resource Locator (URL) information, which includes information for determining the content the beacon is conveying or the content itself.

Beacon registries provide content for the client device upon receiving a BLE transmission from a beacon. Beacon registries are well known databases that contain content associated with a beacon. For example, upon receiving a beacon transmission, the client device may extract a UID associated with the beacon, and query the beacon registry using the UID as a key. The beacon registry queries content associated with that UID and transmits the associated content to the client device. Often the associated content takes the form of a website URL which is intended for use by the client device. Currently, the associated content is handled by the device without knowledge of the safety or the source of the transmission from the beacon. The beacon registry typically does not verify the content contained therein, so it is possible for the client device to access the content and be exposed to malicious data.

Expectations for the deployment of beacons are quite high due to the low cost of production and operation. Current projections predict that shipments of beacons will exceed four hundred million units by the year 2020.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

The term "machine readable medium" can refer to a single physical medium or a collection of physical media that together store data or instructions described as being stored on the medium.

Figure 1:
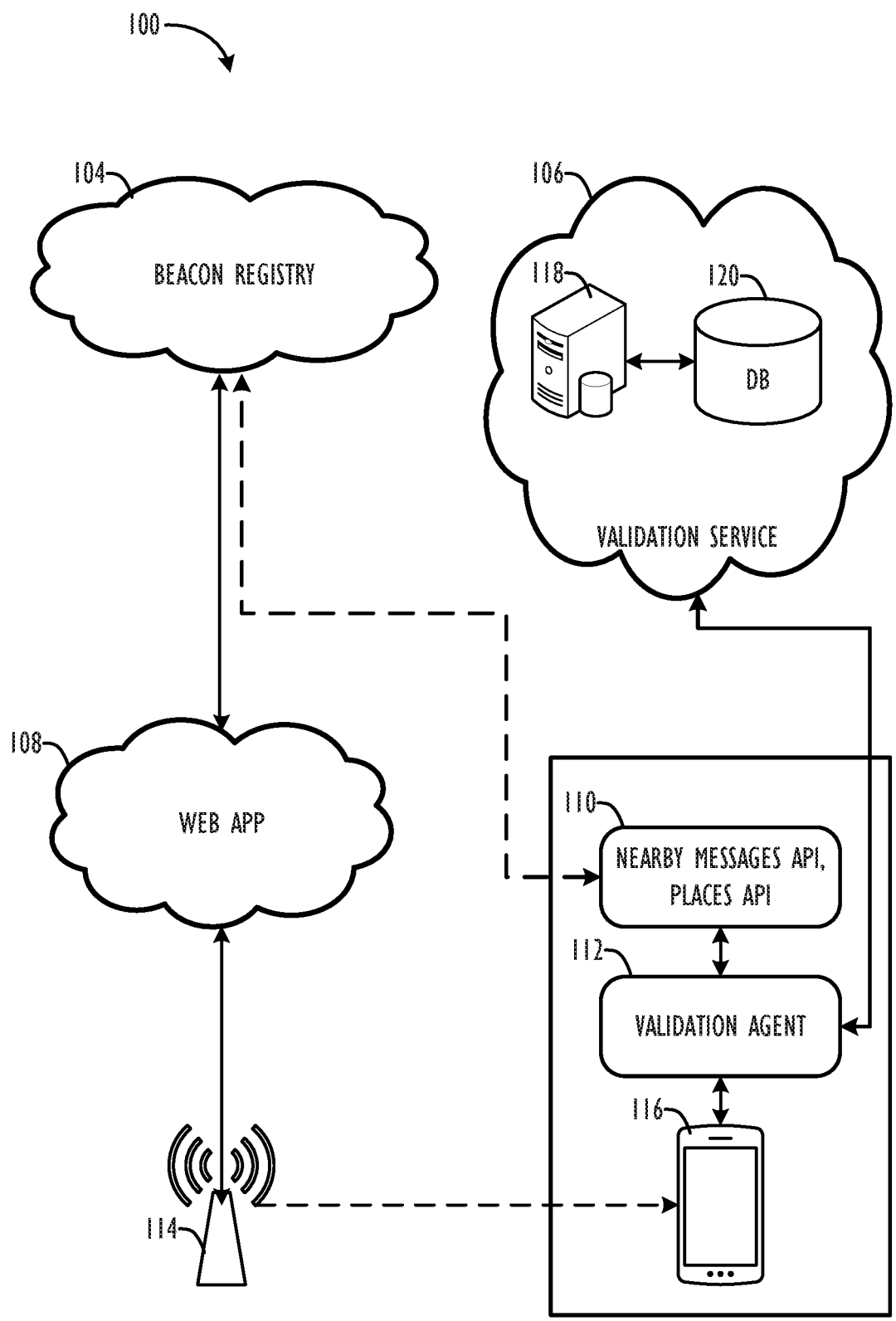
FIG. 1 is a block diagram illustrating a system for receiving and determining the safety of beacon transmissions according to one embodiment.

FIG. 1 depicts a block diagram 100 illustrating a system for receiving and determining the safety of beacon transmissions according to one embodiment.

Prior to the transmission of any beacon signals, the beacon 114 needs to be configured. A web app 108 typically provides an interface between the beacon 114 and a beacon registry 104. The web app 108 provides the interface to input the beacon identification information into the beacon registry 104, as well as to tie that beacon identification information to beacon content. One example would be for the beacon identification information to comprise a universally unique identifier (UUID) paired with a URL. The URL may be the address of a public or private beacon registry 104. A public registry may take the form of a cloud based service, often administered by a different party than the one operating the beacon. The public registry provides an interface that is openly accessible by all beacon operators. A private registry differs from a public registry in that it has controlled access and only certain beacons, often defined by their UUID, may have access. Often the operator of the private registry is the same as the beacons seeking access. The combination with the URL with the UUID identifies a specific beacon 114 in the beacon registry 104. Alternatively, the UUID may be used to identify a specific beacon 114 in a well-known beacon registry 104 if the URL is not present.

Upon creating an entry in the beacon registry 104 associated with the beacon 114, the web app 108 may assign beacon content to the entry in the beacon registry 104. Examples of the beacon content may include URL web links to product descriptions, advertisements, consumer surveys, etc.

Once the beacon 114 has been registered with the beacon registry 104, the common usage pattern consists of a user device 116 receiving a transmission from a beacon 114. The user device 116 extracts the beacon identification information, and queries the beacon registry 104 for the beacon content. The user device 116 then provides the retrieved beacon content to applications executing on the user device 116. The beacon content is not verified for safety and exposes the user device to potentially malicious code.

The user device 116 may provide a level of safety from potentially malicious beacon initiated transmissions by utilizing a framework to support a validation service 106.

Upon receiving a transmission from a beacon 114, the user device 116 processes the beacon identification information in a validation agent 112 that operates with the validation service 106. The validation agent 112 may operate as a part of the operating system (OS), middleware between the OS and the applications, or an application. The beacon identification information often includes raw information revealing hardware and firmware details of the beacon, telemetry information of the beacon, and manufacturing source. Additionally, the beacon identification information includes details used to derive data points about the beacon including data used to associate malicious data with the beacon, and data used to derive trustworthiness of manufacturing origin of the beacon. The validation agent 112 extracts the beacon identification information and utilizes one or more application programming interfaces 110 (APIs) to interface with the beacon registry 104. In other embodiments, different beacon registries may use different APIs 110. Similar to the web app 108 registering the beacon 114 with the beacon registry 104, the APIs 110 interface with the beacon registry 104. In some embodiments, the APIs 110 are utilized with the extracted beacon identification information, including UUIDs and URLs, to query the beacon registry 104 and retrieve the beacon content.

The beacon registry 104, through the API 110, sends the beacon content associated with the beacon identification information back to the validation agent 112. The validation agent 112 acts as a verification gateway, and sends the resultant beacon content, beacon identification information, and contextual information to the validation service 106. Contextual information includes a geo-physical location of the validation agent, the time the transmission was received, and a contextual location. A contextual location is further described by landmarks physically located nearby. For example, a beacon located in shopping mall, might have a contextual location of a mall, which implies that the beacon is contextually located in a retail environment. Contextual location may be determined by the validation agent 112 at the time when the transmission is received based at least in part on the geo-physical location, and previous beacon transmissions received.

The validation service 106 maintains a record of beacons 114 that have interfaced with user devices 116 executing the validation agent 112. The validation service 106 catalogs information related to the beacon 114. The validation service 106 may also catalog whether the beacon occupies a well-known geo-physical location, and any known historical activity with the beacon. If the beacon identification information does not exist in the validation service 106 catalog, it is added along with any beacon content and contextual information. In the querying of the catalog, the validation service 106 may maintain data relating to how many times a specific beacon is interfaced, and keep a safety history. In some implementations, historical activity of the beacon may age off, and a beacon's past malicious behavior may be purged.

The validation service 106 may compare the manufacturing origin as well as hardware and firmware versions may be used to determine trustworthiness of the beacon. For example, if a beacon is detected to be from a well-known manufacturing origin, however the firmware details appear suspect, the validation service 106 may record that data point.

The validation service 106 also may evaluate the beacon content. This involves evaluating the beacon content itself, and any additional content the beacon content may reference. For example, if the beacon content is a URL, the validation service 106 evaluates the URL character string itself, as well as the content of the website to which the URL points. The validation service 106 examines any content returned from the URL request searching for any potentially malicious code.

The validation service 106 also determines a beacon safety score. Alternately, in other embodiments, the beacon safety score may be implemented as a beacon danger score, where the scores are interpreted differently. In one embodiment, the score is a numerical value determined by the combination of results assigned to the evaluation of the content, as well as metrics derived from historical interactions with the beacon as logged in the catalog. For example, if a beacon has been accessed by many devices and developed a safe history in conjunction with a currently favorable evaluation of the beacon content, then the beacon safety score would be high. Alternatively, if the known safety history is low in conjunction with a current evaluation of the content as malicious, the beacon would receive a low beacon safety score. Finally, if a beacon has no known history in conjunction with a current evaluation as non-malicious, the beacon safety score may be midlevel, indicating caution to the user.

The validation service 106 stores any resultant beacon safety score in the catalog as a data point for future reference. The validation service 106 returns the beacon safety score to the validation agent 112.

The validation service 106 may include at least one server 118 which facilitates the sending and receiving of information from the user device 116, as well as the evaluation of the content provided to the validation service 106 from the user device 116.

Coupled to the server 118, is a database 120. The database facilitates the historical data necessary to build a beacon safety history. Implementation of the database may vary from off the shelf database packages to custom developed systems.

The validation agent 112 may present the user with a notification indicative of the beacon safety score. For example, ranges of beacon safety scores may be represented by the validation agent 112 using colors similar to a traffic light, where green indicates safe, yellow indicates uncertainty or caution, and red indicates safe. Any desired threshold between ranges of score values may be used as desired, and may be configurable. Other techniques may be used to represent the beacon safety score, and do not have to be visual in nature. Audio notifications may be used to indicate the beacon safety score.

Figure 2:
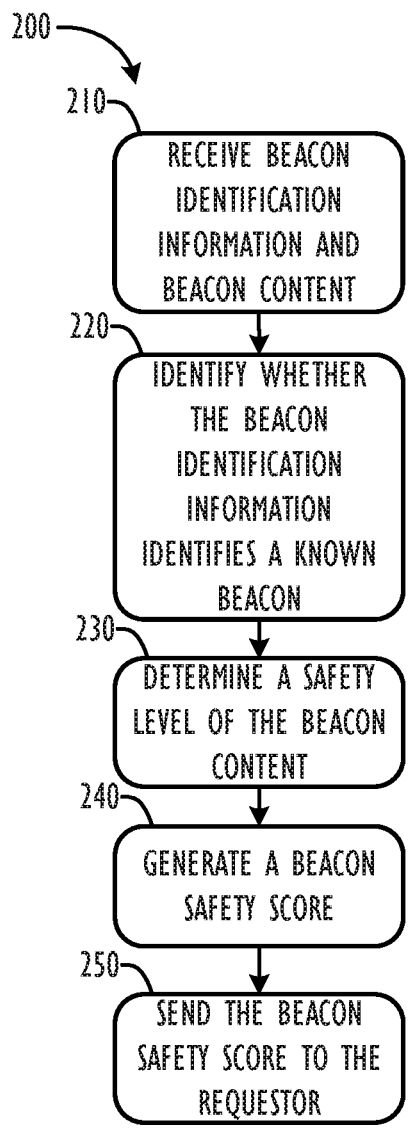
FIG. 2 is a flowchart illustrating a technique for receiving and determining the safety of beacon transmissions according to one embodiment.

FIG. 2 depicts a flowchart 200 illustrating a technique for receiving and determining the safety of beacon transmissions according to one embodiment.

Flowchart 200 represents a way of determining the beacon safety score as calculated by the validation service 106.

The validation service 106 receives beacon identification information and the beacon content 210. Generally, in its most simple form, this is information that is likely to uniquely identify a beacon. For example, a UUID extracted out of a beacon transmission and a URL for a corresponding beacon registry 104 may compose beacon identification information. It may also include additional contextual information as described above as well. The beacon content is the output from the beacon registry 104 query.

The validation service 106 identifies whether the beacon identification information identifies a known beacon 220. In one embodiment, a database indexed on the UUID value may be used as a key. Upon querying the database with the UUID, the database returns an entry for the beacon if it is known, or optionally returns nothing or an indication that the beacon is unknown. The entry for a beacon may also contain other information relating to past queries for the beacon. The entry may include past beacon safety scores, times of queries, location of the beacon, and the beacon content itself.

The validation service 106 determines a safety level of the beacon content 230. The beacon content string may be parsed to evaluate correct syntax. If the beacon content is a hyper transport protocol (HTTP) URL, it may be traversed in a web browser and the content of the HTTP response may be parsed to identify malicious scripts embedded in the response. In the case that the beacon content is not a web based URL, the validation service 106 may use an appropriate mechanism to evaluate the beacon content. For example, if the URL is a file transfer protocol (FTP) address, the validation service 106 may use a (FTP) application to evaluate the beacon content. The beacon content traversal may be executed in an isolated environment for safety purposes. The isolated environment may include a Trusted Execution Environment (TEE).

Additionally, the validation service 106 evaluates the beacon content for privacy concerns. The validation service 106 may evaluate content that would allow downstream beacon transmission applications to collect unauthorized private information. For example, this could include beacon content directing users to URLs that are not malicious on their face, however setting session cookies for user tracking. Subsequent applications may then utilize the session cookies to obtain unauthorized user information and profile a user. Another example would be the detection by the validation service 106 of beacon content indicative of an attempt to supply applications with beacon content designed to assist in the reset of the device's advertisement ID, or augment data associated with the device's advertisement ID.

The validation service 106 then generates a beacon safety score 240. The beacon safety score may be a numerical value. In one embodiment, the numerical value is representative of whether the beacon is a known safe beacon combined with the evaluation of the beacon content. For example, if the beacon has a history of generating safe beacon safety scores, it may have a high value for the known safe beacon component. Additionally, if a beacon has a trusted manufacturing origin, and/or well reputed geo-physical location it may also be a known safe beacon. A well reputed geo-physical location is a location, as reported by the user device 116, where beacon information stored in the validation service 106 indicate that surrounding beacons in the same geo-physical area are safe. If the beacon content associated with that beacon also is evaluated safe, then the beacon safety score would be the combination of those two high values. Alternatively, those two components may be returned to the validation agent 112, where the validation agent 112 makes the determination on how to apply those values to alert the user to beacon safety. In another embodiment, the validation service 106 may store the beacon safety score as another metric for future evaluations of the beacon safety score or be used to modify an existing score, as keeping a running average beacon safety score.

Additionally, the validation service may store various metrics of beacon performance including rate of transmission individually or as an aggregate over multiple validation agents 112.

The validation service 106 then transmits the beacon safety score back to the requestor 250 who originally sent the beacon identification information and beacon content at block 210.

Figure 3:
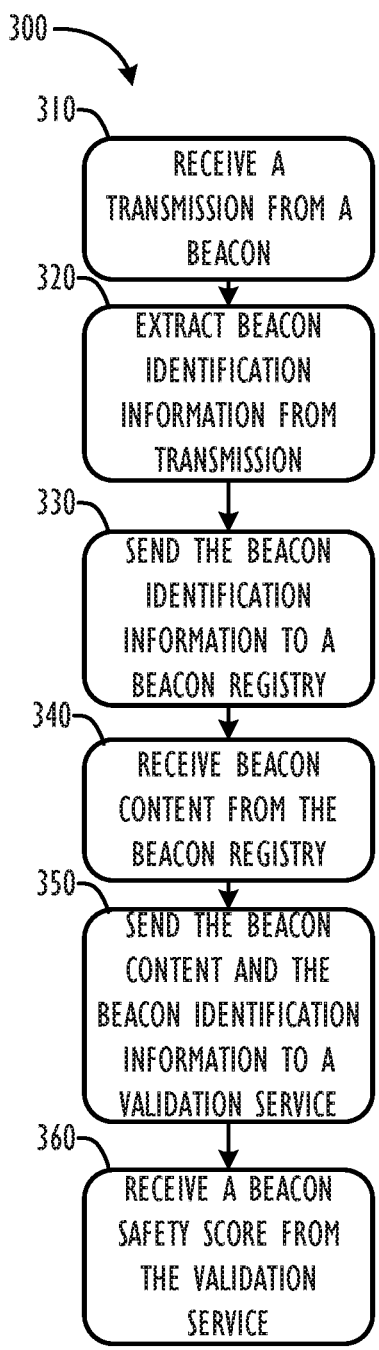
FIG. 3 is a flowchart illustrating a technique for generating a beacon safety score according to another embodiment.

FIG. 3 depicts a flowchart 300 illustrating a technique for generating a beacon safety score according to another embodiment.

Flowchart 300 represents a way of receiving a beacon transmission by a user device 116 and the processing of that transmission.

A user device 116 receives a transmission from a beacon in block 310. This occurs across a beacon protocol (e.g. Eddystone). The transmission should include enough information to uniquely identify the beacon 114 and any beacon registry 104 with which the beacon may be associated.

The user device 116 extracts the beacon identification information from the beacon transmission in block 320. Extracting beacon identification information involves processing the frames of the transmission and identifying which portions of the transmission identify the beacon. For example, UID and URL frames for the Eddystone protocol include information identifying the beacon and the beacon registry. Processing of the frames would require that the user device 116 extract a unique beacon identifier and registry information. In the Eddystone example above, the registry information would correspond to the URL frames. In the iBeacon case, the registry information would be a statically defined by the APIs 110. Registry information may address both private and public registries. Additionally, the user device 116 computes additional contextual information around the reception of the transmission. This contextual information may include the geo-physical location, the time that the transmission was received, and the contextual location.

The user device 116 sends the beacon identification information to the beacon registry in block 330. Utilizing the information extracted at block 320, the user device 116 may properly identify the associated beacon registry 104. The validation agent 112 may interface with beacon registry APIs to address and access the beacon registry 104. For example, the URL frame mentioned above may contain the appropriate information to address a beacon registry 104 and the API would facilitate the query for the beacon based on the information from the UID frame.

The user device 116 receives the beacon content from the beacon registry in block 340. The beacon content consists of the data that the beacon was implemented to convey. The beacon content may take the form of a URL to a desired website. For example, a beacon may be placed in a grocery store near a specific brand of soups. The beacon content returned by the beacon registry 104 would then be a URL directing the user device 116 to display a web page with more information on the specific brand of soups.

The user device 116 sends the beacon content and the beacon identification information to the validation service in block 350. Upon reception of the beacon content, the user device 116 through a validation agent 112 currently executing, transmits the beacon content and the beacon identification information to the validation service 106. As the validation agent 112 is the agent of the validation service's framework, the addressing as well as the mechanism for transport for the validation service 106 may be incorporated into the validation agent 112. If the mechanism for transport fails, the validation service 106, may not be available, which may necessitate the validation agent 112 to notify the user.

The user device 116 receives a beacon safety score from the validation service in block 360. The validation agent 112 acts as an agent for or client of the validation service 106 and receives the beacon safety score. The user device 116 may now use the beacon safety score to indicate to the user the safety of the beacon. In one embodiment, the safety score may be used to implement a "traffic light" system indicating green for safe, yellow for caution, and red for unsafe. Alternatively, or in combination, the user device 116 may suppress any beacon transmissions with beacon safety scores not meeting a predetermined safety threshold. The validation agent 112 may additionally store transmission data from receiver applications, as beacon transmissions are forwarded to other applications.

Figure 4:
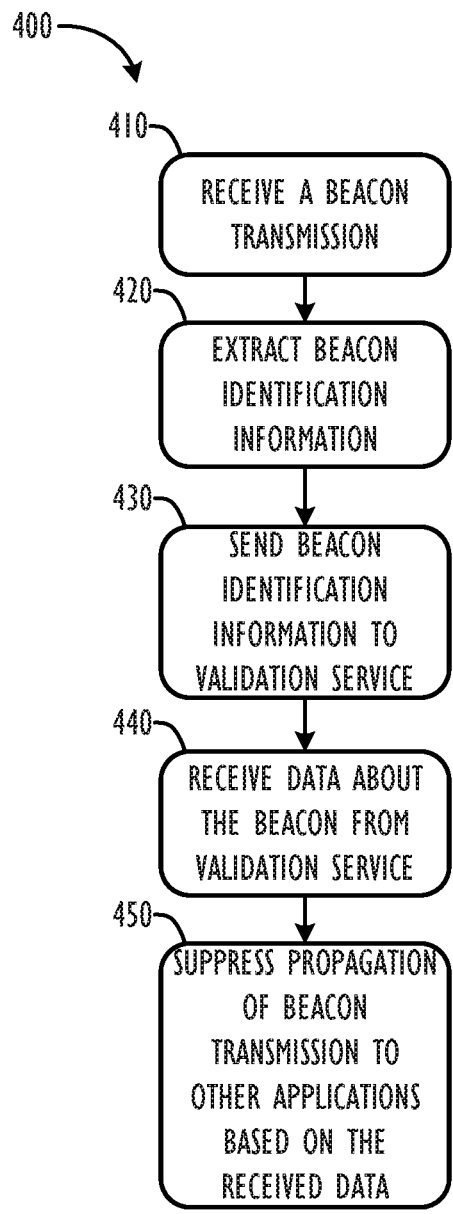
FIG. 4 is a flowchart illustrating a technique for suppressing beacon transmissions according to one embodiment.

FIG. 4 depicts a flowchart 400 illustrating a technique for suppressing beacon transmissions according to one embodiment.

Flowchart 400 represents a way of receiving a beacon transmission by a user device 116 and the suppression of that transmission based on criteria.

A user device 116 receives a beacon transmission from a beacon 410. This occurs across a beacon protocol (e.g. Eddystone). The transmission should include enough information to uniquely identify the beacon 114 and any beacon registry 104 with which the beacon may be associated. Alternatively, the transmission may include only enough information to identify the beacon, as long the registry information may be retrieved from the registry APIs 110.

The user device 116 extracts the beacon identification information from the beacon transmission 420. Extracting beacon identification information involves processing the frames of the transmission and identifying which portions of the transmission identify the beacon. For example, UID and URL frames for the Eddystone protocol include information identifying the beacon and the beacon registry. Processing of the frames would require that the user device 116 extract a unique beacon identifier and registry information. In the Eddystone example above, the registry information would correspond to the URL frames. Registry information may address both private and public registries. Additionally, the user device 116 computes additional contextual information around the reception of the transmission. This contextual information may include the geo-physical location of the user device 116, the time that the transmission was received, and the contextual location.

The user device 116 sends the beacon identification information to the validation service 430. Utilizing the information extracted at block 420, the user device 116 may identify the associated beacon registry 104. The user device 116 may interface with APIs to address and access the beacon registry 104. For example, the URL frame mentioned above may contain the appropriate information to address a beacon registry 104 and the API would facilitate the query for the beacon based on the information from the UID frame.

The user device 116 receives data about the beacon from the validation service 440. In this embodiment, the user device 116 may receive data about the beacon, including the beacon safety score. This data describes the content that the beacon is directing the user device 116 to view. Beacon types may be included in the data. Age restrictive information may be included in the data as well. For example, the data may indicate that the beacon is promoting products, or that the beacon is presenting information not intended for children.

The user device 116 suppresses the propagation of the beacon transmission to other applications running on the user device 116 based on that data 450. Based on the data received at block 440 and a set of user preferences, the user device 116 determines if the beacon transmission should be suppressed. The set of user preferences may indicate acceptable types, times, and locations to receive beacon transmissions. For example, if the user preferences block all media content rated higher than PG and the received data indicates the beacon is directing the user to a media website with content rating of R, the user device 116 will suppress that transmission. Likewise, if the user preferences block all unsolicited advertisements, any beacon directing the user to advertising websites will be suppressed. Additionally, the user device 116 may reset time to live (TTL) affected networking components in order to remain anonymous to the transmitter. Furthermore, the user device 116 may alert the user that data transmitted may be used to pinpoint the location or path traversed by a user.

Figure 5:
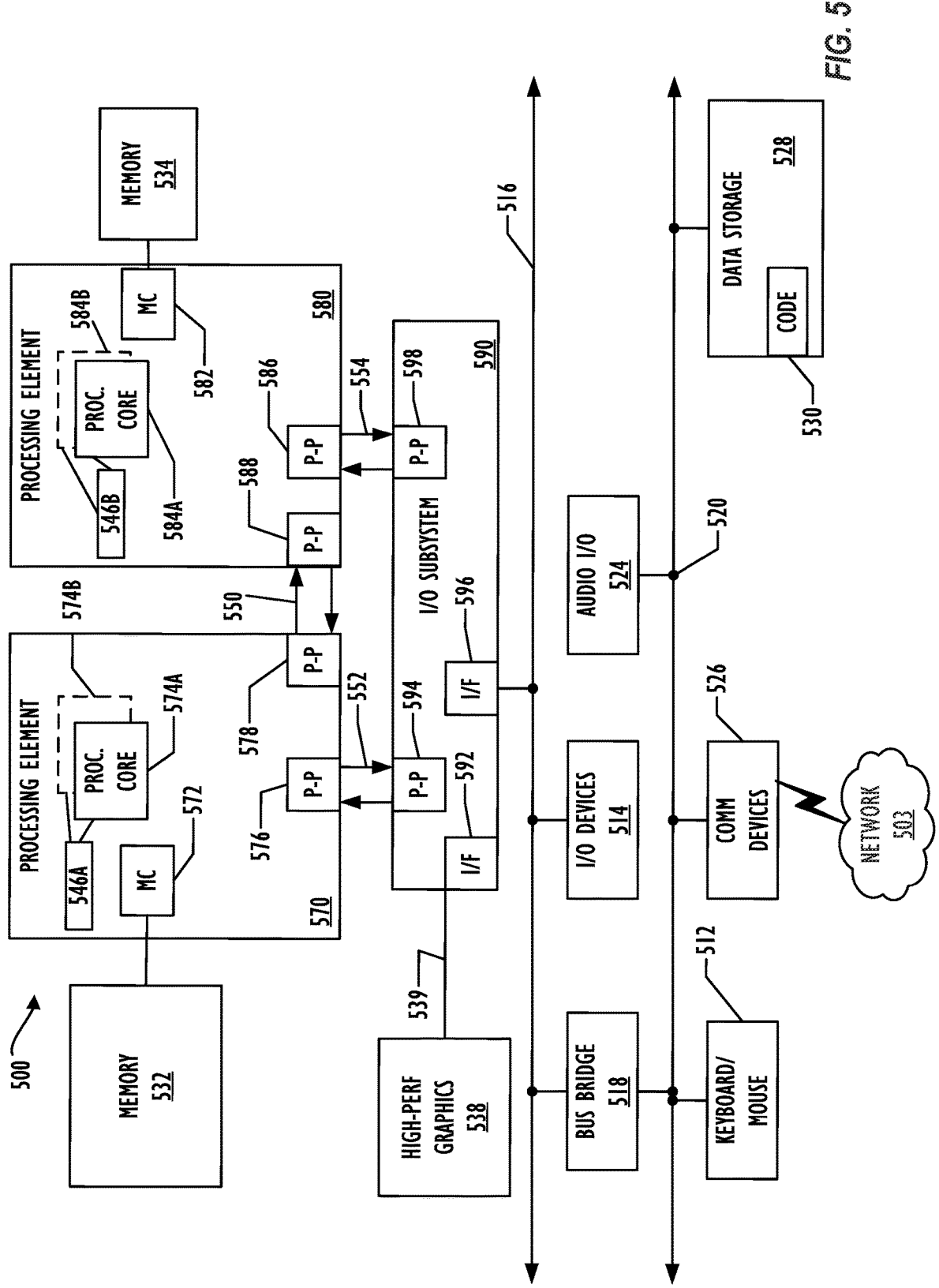
FIG. 5 is a block diagram illustrating an embodiment of a computing device for use with techniques described herein.

Referring now to FIG. 5, a block diagram illustrates a programmable device 500 that may be used for implementing the techniques described herein in accordance with one or more embodiments. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574*a* and 574*b* and processor cores 584*a* and 584*b*). Such cores 574*a*, 574*b*, 584*a*, 584*b* may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546*a*, 546*b* may store data (e.g., computing instructions) that are utilized by one or more components of the processing element, such as the cores 574*a*, 574*b* and 584*a*, 584*b*, respectively. For example, the shared cache may locally cache data stored in a memory 532, 534 for faster access by components of the processing elements 570, 580. In one or more embodiments, the shared cache 546*a*, 546*b* may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
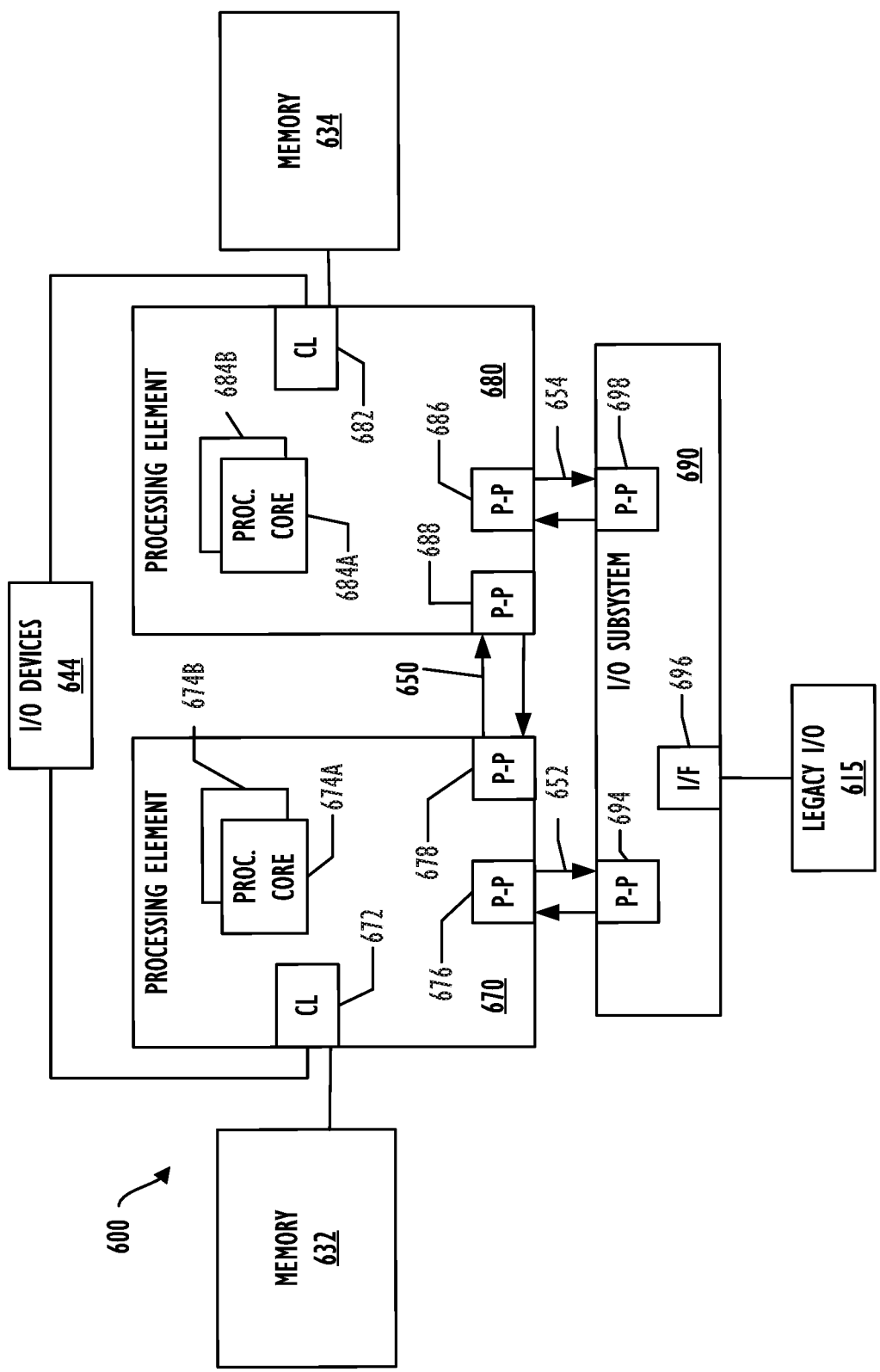
FIG. 6 is a block diagram illustrating another embodiment of computing device for use with techniques described herein.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654.

Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

The following examples pertain to further embodiments.

Example 1 is a machine readable medium, on which are stored instructions for determining beacon safety, comprising instructions that when executed cause a machine to: receive a beacon identification information and a beacon content associated with a beacon; determine whether the beacon identification information identifies a known beacon; determine a safety level of the beacon content; generate a beacon safety score based on the safety level and the beacon identification information; and send the beacon safety score to a requester.

In Example 2 the subject matter of Example 1 optionally includes wherein the beacon safety score comprises a value derived from the safety level of the beacon content and the beacon identification information.

In Example 3 the subject matter of Example 1 optionally includes wherein the instructions to determine whether the beacon identification information identifies a known beacon comprise instructions that evaluate a manufacturing origin of the beacon, a geo-physical location of the beacon, and historical activity associated with the beacon.

In Example 4 the subject matter of Example 1 optionally includes wherein the beacon content comprises a uniform resource locator, and the instructions to determine a safety level of the beacon content comprises evaluating the uniform resource locator and content addressed by the uniform resource locator.

In Example 5 the subject matter of any of Examples 1-4 optionally includes wherein the beacon identification information comprises hardware information associated with the beacon and telemetry information received, both received from the beacon, data used to associate malicious data with the beacon, and data used to derive trustworthiness of manufacturing origin of the beacon, data used to determine whether the beacon occupies a well reputed geo-physical location, and data used to associate a known historical activity with the beacon.

In Example 6 the subject matter of any of Examples 1-4 optionally includes further comprising instructions to store the beacon safety score.

Example 7 is a system for determining safety of beacon transmissions, comprising: one or more processors; memory coupled to the one or more processors on which are stored instructions, comprising instructions that when executed cause at least some of the one or more processors to: receive a beacon transmission from a beacon; extract a beacon identification information from the beacon transmission; send the beacon identification information to a beacon registry; receive a beacon content from the beacon registry; send the beacon content and the beacon identification information to a validation service; and receive, from the validation service, a beacon safety score.

In Example 8 the subject matter of Example 7 optionally includes further comprising instructions to suppress the beacon content of the beacon based on the beacon safety score.

In Example 9 the subject matter of Example 7 optionally includes further comprising instructions to identify the beacon registry.

In Example 10 the subject matter of Example 7 optionally includes wherein the beacon safety score indicates whether the beacon is safe and whether the beacon content is safe.

In Example 11 the subject matter of any of Examples 7-10 optionally includes wherein the beacon safety score indicates whether the beacon has a trusted manufacturing origin, a well reputed geo-physical location, and known historical activity.

In Example 12 the subject matter of any of Examples 7-10 optionally includes wherein the instructions to extract beacon identification information from the beacon transmission comprise instructions to: extract a beacon identifier from the beacon transmission; extract a registry information from the beacon transmission; and compute a contextual information, wherein the contextual information comprises a geo-physical location, a time transmission received, and a contextual location associated with the beacon.

In Example 13 the subject matter of Example 12 optionally includes wherein the registry information comprises an address of a private beacon registry.

In Example 14 the subject matter of any of Examples 7-10 optionally includes further comprising instructions to present a visual representation indicative of the beacon content based on the beacon safety score.

Example 15 is a method for suppressing beacon transmissions, comprising: receiving a beacon transmission from a beacon; extracting a beacon identification information from the beacon transmission; sending the beacon identification information to a validation service; receiving, from the validation service, data associated with the beacon; and suppressing, based on the data, propagation of the beacon transmission to other applications.

In Example 16 the subject matter of Example 15 optionally includes wherein the suppressing comprises evaluating the data against a set of user preferences.

In Example 17 the subject matter of Example 16 optionally includes wherein the set of user preferences comprises acceptable times of day to receive beacon transmissions.

In Example 18 the subject matter of Example 16 optionally includes wherein the set of user preferences comprise acceptable types of beacon transmissions.

In Example 19 the subject matter of Example 16 optionally includes wherein the set of user preferences comprise acceptable locations to receive beacon transmissions.

In Example 20 the subject matter of any of Examples 15-19 optionally includes further comprising notifying a user of received suppressed beacon transmissions.

Example 21 is an apparatus comprising: a processor; and a memory coupled with the processor, on which are stored instructions, comprising instructions that when executed cause the processor to: receive a beacon identification information and a beacon content associated with a beacon; determine whether the beacon identification information identifies a known beacon; determine a safety level of the beacon content; generate a beacon safety score based on the safety level and the beacon identification information; and send the beacon safety score to a requester.

In Example 22 the subject matter of Example 21 optionally includes wherein the beacon safety score comprises a value derived from the safety level of the beacon content and the beacon identification information.

In Example 23 the subject matter of Example 21 optionally includes wherein the instructions to determine whether the beacon identification information identifies a known beacon comprise instructions that evaluate a manufacturing origin of the beacon, a geo-physical location of the beacon, and historical activity associated with the beacon.

In Example 24 the subject matter of Example 21 optionally includes wherein the beacon content comprises a uniform resource locator, and the instructions to determine a safety level of the beacon content comprises evaluating the uniform resource locator and content addressed by the uniform resource locator.

In Example 25 the subject matter of any of Examples 21-24 optionally includes wherein the beacon identification information comprises hardware information associated with the beacon and telemetry information received, both received from the beacon, data used to associate malicious data with the beacon, and data used to derive trustworthiness of manufacturing origin of the beacon, data used to determine whether the beacon occupies a well reputed geo-physical location, and data used to associate a known historical activity with the beacon.

In Example 26 the subject matter of any of Examples 21-24 optionally includes further comprising instructions to store the beacon safety score.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage device comprising instructions which, when executed, cause a machine to at least:
receive beacon identification information and beacon content associated with a beacon, the beacon content obtained based on a beacon registry uniform resource locator received from the beacon, the beacon content including a uniform resource locator;
determine whether the beacon identification information identifies a known beacon;
determine a safety level of the beacon content by:
accessing a hyper transport protocol uniform resource locator included in the beacon content; and
parsing a response associated with the access to identify malicious scripts of the response;
generate a beacon safety score for the beacon based on the safety level, a history of safety scores for the beacon, and whether the beacon is in a well-reputed geo-physical location; and
send the beacon safety score to a requester.

2. The storage device of claim 1, wherein the beacon safety score includes a value derived from the safety level of the beacon content of the beacon and the beacon identification information.

3. The storage device of claim 1, wherein the instructions, when executed, cause the machine to evaluate at least one of a manufacturing origin of the beacon, a geo-physical location of the beacon, or historical activity associated with the beacon.

4. The storage device of claim 1, wherein the instructions, when executed, cause the machine to base the beacon safety score on a value corresponding to the beacon content of the beacon.

5. The storage device of claim 1, wherein the beacon identification information includes at least one of hardware information associated with the beacon, telemetry information associated with the beacon, malicious data information associated with the beacon, data indicative of trustworthiness of manufacturing origin of the beacon, data indicative of whether the beacon occupies the well-reputed geo-physical location, or data indicative of known historical activity associated with the beacon.

6. The storage device of claim 1, wherein the instructions, when executed, cause the machine to store the beacon safety score.

7. The storage device of claim 1, wherein the instructions, when executed, cause the machine to access the hyper transport protocol uniform resource locator of the beacon content in an isolated environment.

8. A system for determining safety of beacon transmissions, the system comprising:
a validation service;
at least one memory;
instructions included in the system; and
a first processor to execute the instructions to at least:
extract beacon identification information and a beacon registry uniform resource locator from a beacon transmission, the beacon transmission originating from a beacon;
send beacon content and the beacon identification information to the validation service, the beacon content obtained by accessing a beacon registry using the beacon registry uniform resource locator; and
determine a safety of the beacon based on a beacon safety score;
a second processor of the validation service to execute the instructions to:
determine whether the beacon identification information identifies a known beacon;
determine a safety level of the beacon content by:
accessing a hyper transport protocol uniform resource locator included in the beacon content; and
parsing a response associated with the access to identify malicious scripts of the response; and
generate the beacon safety score for the beacon based on the safety level, a history of safety scores for the beacon, and whether the beacon is in a well-reputed geo-physical location.

9. The system of claim 8, wherein the first processor is to suppress the beacon content of the beacon based on the beacon safety score.

10. The system of claim 8, wherein the first processor is to identify the beacon registry.

11. The system of claim 8, wherein the beacon safety score indicates at least one of whether the beacon is safe and whether the beacon content is safe.

12. The system of claim 11, wherein the beacon safety score indicates at least one of whether the beacon has a trusted manufacturing origin, a well-reputed geo-physical location, or known historical activity.

13. The system of claim 8, wherein the first processor is to extract the beacon identification information from the beacon transmission by:
extracting a beacon identifier from the beacon transmission;
extracting registry information from the beacon transmission; and
computing contextual information, the contextual information including at least one of a geo-physical location, a time transmission received, or a contextual location associated with the beacon.

14. The system of claim 13, wherein the registry information includes an address of a private beacon registry.

15. The system of claim 13, wherein the first processor is to present a visual representation indicative of the beacon content based on the beacon safety score, the visual representation including a first color when at the beacon safety score corresponds to a safe score, a second color when the beacon safety score corresponds to an uncertain score, and a third color when the beacon safety score corresponds to an unsafe score.

16. A method for suppressing beacon transmissions, the method comprising:
extracting, by executing an instruction with at least one processor, beacon identification information and a beacon registry uniform resource locator from a beacon transmission, the beacon transmission originating from a beacon;
sending beacon content and the beacon identification information to a validation service, the beacon content obtained by accessing a beacon registry using the beacon registry uniform resource locator;
receiving, from the validation service, a beacon safety score, the beacon safety score based on a search for malicious code corresponding to the beacon content, a history of safety scores for the beacon, and whether the beacon is in a well-reputed geo-physical location; and presenting, by executing an instruction with the at least one processor, a visual representation indicative of the beacon content based on the beacon safety score, the visual representation including a first color when at the beacon safety score corresponds to a safe score, a second color when the beacon safety score corresponds to an uncertain score, and a third color when the beacon safety score corresponds to an unsafe score; and suppressing propagation of the beacon transmission based on the beacon safety score.

17. The method of claim 16, wherein the suppressing includes evaluating the beacon safety score against a set of user preferences.

18. The method of claim 17, wherein the set of user preferences includes acceptable times of day to receive the beacon transmissions.

19. The method of claim 17, wherein the set of user preferences includes acceptable types of the beacon transmissions.

20. The method of claim 16, further including notifying a user of received suppressed beacon transmissions.

* * * * *